No. 846,461. PATENTED MAR. 12, 1907.
A. W. ENGEL.
PERIMETER MEASURING DEVICE.
APPLICATION FILED FEB. 3, 1906.
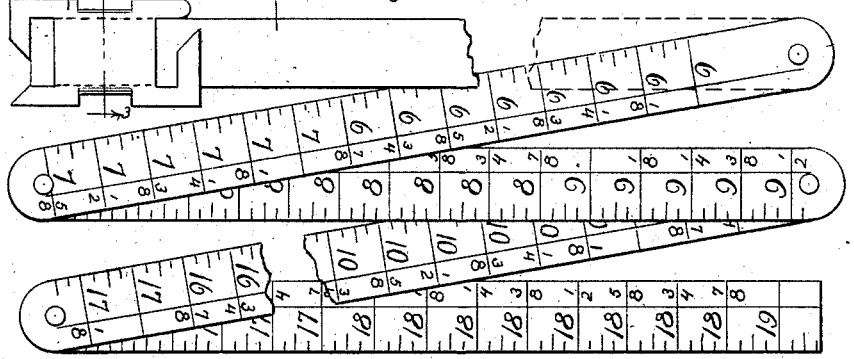
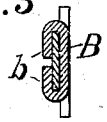
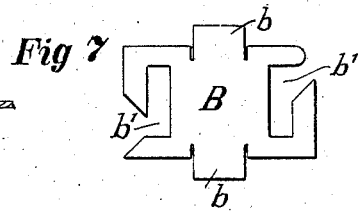
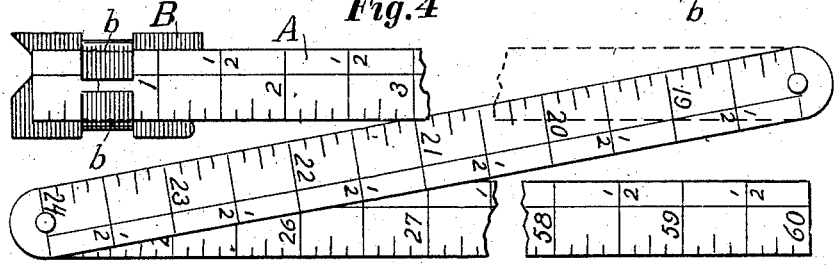
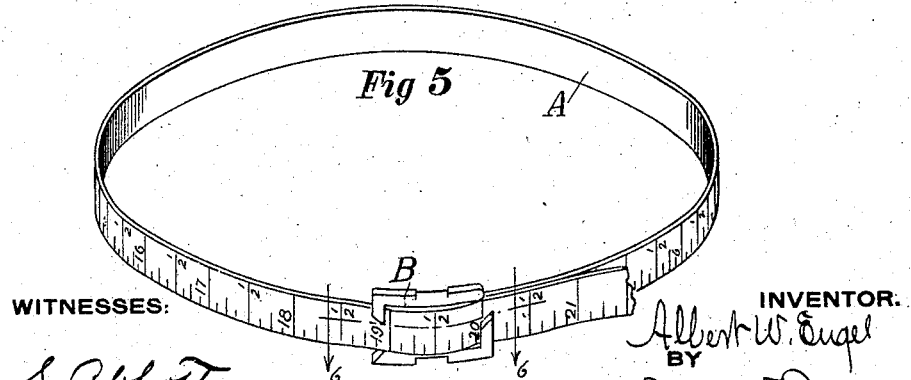
WITNESSES:
J. S. Abbott
M. Gertrude Ady
INVENTOR.
Albert W. Engel
BY
Burton Burton
his ATTORNEYS

UNITED STATES PATENT OFFICE.

ALBERT W. ENGEL, OF CHICAGO, ILLINOIS.

PERIMETER-MEASURING DEVICE.

No. 846,461.　　　　Specification of Letters Patent.　　　Patented March 12, 1907.

Application filed February 3, 1906. Serial No. 299,277.

*To all whom it may concern:*

Be it known that I, ALBERT W. ENGEL, a citizen of the United States, residing at Chicago, in the county of Cook and State of Illinois, have invented new and useful Improvements in Perimeter-Measuring Devices, of which the following is a specification, reference being had to the accompanying drawings, forming a part thereof.

This invention is designed for such purposes as ring-gage, bracelet-gage, collar or hat scale, or other purposes requiring the measure of the perimeter of any object which may be encompassed by a flexible measuring-tape.

It consists of the features of construction set out in the claims.

In the drawings, Figure 1 is a plan view of a ring-gage embodying my invention. Fig. 2 is a plan view of a gage which may be used for a hat-gage, stovepipe-gage, or other purpose requiring measure of the circumference of a substantially or approximately cylindrical body for determining its diameter. Fig. 3 is a section at the line 3 3 on either Fig. 1 or 2, being on the scale of Fig. 2. Fig. 4 is an opposite side view of the gage shown in Fig. 2, the scale on the side shown in Fig. 2 being laid off in units of diameter corresponding to inches of circumference and on the side shown in Fig. 4 in inches of direct measure—that is, in circumference of the body measured. Fig. 5 is a view of the device shown in Fig. 2 coiled for measuring the outer circumference of a body, showing the mode of engaging the tape with the terminal clip. Fig. 6 is a section at the line 6 6 on Fig. 5. Fig. 7 is plan view of a blank from which the clip is formed.

The tape A employed in this device is of course necessarily flexible and is preferably, also, of spring material, so that it may be readily employed to measure the inner perimeter of a hollow or open body, as of a hat, as readily as the outer perimeter of such a body as a stovepipe or column. The spring character of the tape is desirable, not only that it may spring out to the inner surface of a hollow body to be measured interiorly, but also that in measuring bodies not perfectly circular, especially somewhat irregular, but which are nevertheless to be encompassed by a circular device for which the measure is desired, as a ring, which is circular, but to be worn on the finger, which is not circular, the spring character of the tape causes it to assume the approximately circular form of which the dimension is desired when it is folded about the irregular and perhaps not even very approximately circular body from which the measure is to be taken. In addition to the tape the device comprises a metal clip secured at one end of it and adapted to engage the other end when properly inserted for the purpose of reading on the scale the measurement and adapted to hold the tape against slipping while the device is moved from the body measured, as will usually be necessary in order to accurately read the measurement indicated.

It is important for the purpose of convenience in marketing the device that the clip should be substantially flat—that is, without projections off from the plane of the tape which would interfere with its ready inclosure for mailing as well as with its compact storage. The form of clip shown in the drawings is devised with this intention. It consists, preferably, of a single piece of metal formed from a blank B, (seen in Fig. 5,) having lateral lugs $b\ b$, which are adapted to be clasped to embrace the tape, as seen in section in Fig. 4, and having toward the ends oblong slots $b'\ b'$, adapted to permit the tape to pass freely through them, said slots being open to the edge of the clip at diagonally opposite corners, so that the running-tape, having encompassed the body to be measured, may have one edge introduced first into one of the slots through the corner-opening and then into the other slot through the opposite corner-opening, the spring of the tape and its tendency to retain its normal straight form and direction causing it to be retained in both the slots, notwithstanding each of them has an opening through which it might under proper conditions escape and through which it is easily withdrawn by spirally springing the tape to relieve it first from one slot and then from the other. Preferably the end of the tape to which the clip is secured by the clasp of the lugs $b$ extends under both the slots, so that the end of the tape coincides with the margin nearest the end of the clip of the slot in which the running-tape is first engaged in using the device for measuring, as described. The tape being elastic, as indicated, the end portion constituting only a short projection beyond the clasping-lug $b$ operates as a comparatively stiff spring to hold the tape up against the under surface of the clip, so as to prevent it from slipping too easily, and, in fact, to cause it to be somewhat positively held by the square corner of the slot against which it is thus pressed while the tape is being engaged with the other slot, for it will be understood that when the tape is engaged with both slots it is practically impossible to draw it through, because its own elasticity tending to cause it to straighten from the curve into which it is forced in extending from one slot to the other over the clip makes it press up against the square corners of the outer edges of both slots, and those edges are thereby caused to bite it somewhat firmly, and this tendency is further increased by the spring action of the tape underlying both the slots and tending to react into straight form up against the clip. Preferably the scale with which the tape is marked is laid off so that the dimension of the encompassed article may be read at the edge of the slot in the outer end of the clip through which the tape extends from the under to the upper side, and when a scale is laid off upon both surfaces of the tape the end of the tape itself which extends under that slot and terminates coincidently with said outer edge of the slot serves as the reading-point for the inner scale.

In the ring-gage shown in Fig. 1 the units of the scale correspond to the conventional numbers of rings—from one to fifteen. The tape shown in Figs. 2 and 4 has the scale upon the outer surface, Fig. 2, marked to correspond to the diameter in inches of the cylindrical body measured by the tape. The opposite scale being laid off in inches, the diameter of any body whose circumference taken in inches is found on the surface of the tape shown in Fig. 4 will be found indicated on the outer scale directly opposite the mark on the inner scale which indicates its circumference. Hat sizes being usually denoted by the diameter in inches of a circle whose circumference in inches is the perimeter of the hat to be fitted, (though neither the hat nor the head are strictly circular,) this scale is adapted for hat measurement as well as for any other purpose requiring measurement of circumference and derivation of diameters in inches.

I claim—

1. A perimeter-measuring device comprising a metal clip having two apertures opening through the opposite lateral edges of the clip, in combination with a flexible tape having one end secured to the clip without occupying either of said apertures, the tape being adapted to pass freely through said apertures successively.

2. A perimeter-measuring device comprising a flexible tape and a metal clip secured to one end thereof, the clip being clenched to the tape intermediate the ends of the clip and having toward each end an oblong aperture whose length is transverse to the tape and through which the tape may pass freely, each aperture being open through to the edge of the clip, said openings being at diagonally opposite corners of the respective apertures.

3. A perimeter-measuring device comprising a flexible tape, a metal clip clenched securely to the tape by being lodged upon one surface thereof and clenched thereto between the ends of the clip, said clip having two transversely-oblong apertures through which the tape may pass freely, said apertures being both covered at one side by the tape and being cut through to the opposite end edges of the clip at the opposite lateral edges of the tape.

In testimony whereof I have hereunto set my hand, in the presence of two witnesses, at Chicago, Illinois, this 1st day of February, 1906.

ALBERT W. ENGEL.

In presence of—
CHAS. S. BURTON,
M. GERTRUDE ADY.